United States Patent
Tashiro

(10) Patent No.: US 11,077,899 B2
(45) Date of Patent: Aug. 3, 2021

(54) CONVEYING APPARATUS

(71) Applicant: MAZDA MOTOR CORPORATION, Hiroshima (JP)

(72) Inventor: Manabu Tashiro, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 260 days.

(21) Appl. No.: 16/202,354

(22) Filed: Nov. 28, 2018

(65) Prior Publication Data
US 2019/0176850 A1 Jun. 13, 2019

(30) Foreign Application Priority Data
Dec. 13, 2017 (JP) .............................. JP2017-238701

(51) Int. Cl.
*B62D 65/18* (2006.01)
*B65G 19/02* (2006.01)
(Continued)

(52) U.S. Cl.
CPC ................ *B62D 65/18* (2013.01); *B61B 3/00* (2013.01); *B61C 13/04* (2013.01); *B65G 19/025* (2013.01);
(Continued)

(58) Field of Classification Search
CPC ...... B65G 19/025; B65G 19/18; B65G 15/30; B65G 21/22; B65G 19/225;
(Continued)

(56) References Cited

U.S. PATENT DOCUMENTS 2,664,993 A 1/1954 Mullen et al.
4,408,539 A * 10/1983 Wakabayashi ............ B61B 3/00
104/172.4
(Continued)

FOREIGN PATENT DOCUMENTS

CN 2575053 Y 9/2003
CN 1891590 A 1/2007
(Continued)

OTHER PUBLICATIONS

An Office Action mailed by China National Intellectual Property Administration dated Jun. 30, 2020, which corresponds to Chinese Patent Application No. 201811485649.1 and is related to U.S. Appl. No. 16/202,354 with English language translation.
(Continued)

*Primary Examiner* — Zachary L Kuhfuss
*Assistant Examiner* — Cheng Lin
(74) *Attorney, Agent, or Firm* — Studebaker & Brackett PC

(57) ABSTRACT

The conveying apparatus includes support body for supporting object to be conveyed; linear moving member extended at predetermined height position and configured to move in predetermined conveying direction; first guide rail including first slope section inclined in conveying direction from predetermined first height position to second height position different from first height position, and configured to support the support body which moves in first slope section; and transmission mechanism configured to transmit driving force of linear moving member to support body when linear moving member moves in conveying direction. Transmission mechanism vertically extends and contracts in response to change in vertical distance between first guide rail and linear moving member extended at predetermined height
(Continued)

position while support body moves on first slope section in conveying direction with being supported by first guide rail.

12 Claims, 3 Drawing Sheets

(51) Int. Cl.
    *B61B 3/00* (2006.01)
    *B61C 13/04* (2006.01)
    *B65G 35/06* (2006.01)
    *B65G 9/00* (2006.01)
    *B65G 17/20* (2006.01)

(52) U.S. Cl.
    CPC .............. *B65G 35/06* (2013.01); *B65G 9/002* (2013.01); *B65G 17/20* (2013.01)

(58) Field of Classification Search
    CPC ...... B65G 2201/02; B65G 2812/02069; B61B 10/02; B62D 65/18
    See application file for complete search history.

(56) References Cited

U.S. PATENT DOCUMENTS

| | | | | |
|---|---|---|---|---|
| 4,464,998 A | * | 8/1984 | Wakabayashi | B62D 65/18 104/172.4 |
| 4,488,493 A | * | 12/1984 | Wakabayashi | B62D 65/18 104/172.4 |
| 4,614,158 A | * | 9/1986 | Helde | B61B 10/025 104/172.4 |
| 2007/0000758 A1 | * | 1/2007 | Matsubara | B65G 49/0459 198/465.4 |
| 2008/0041699 A1 | * | 2/2008 | Nakamura | B65G 19/025 198/678.1 |
| 2008/0135382 A1 | * | 6/2008 | Nakamura | B61B 10/02 198/463.2 |

FOREIGN PATENT DOCUMENTS

| | | | | |
|---|---|---|---|---|
| CN | 100411927 C | | 8/2008 | |
| CN | 101549834 A | | 10/2009 | |
| CN | 204568658 U | | 8/2015 | |
| CN | 206466586 U | | 9/2017 | |
| GB | 1200629 A | * | 7/1970 | ........... B61B 10/022 |
| JP | S56-122715 A | | 9/1981 | |
| JP | H01-181615 A | | 7/1989 | |
| JP | 2004-315215 A | | 11/2004 | |
| JP | 2009-083952 A | | 4/2009 | |
| JP | 2013-039857 A | | 2/2013 | |
| JP | 2014001042 A | * | 1/2014 | |

OTHER PUBLICATIONS

An Office Action mailed by the Japanese Patent Office dated Jan. 29, 2019, which corresponds to Japanese Patent Application No. 2017-238701 and is related to U.S. Appl. No. 16/202,354.

* cited by examiner

CONVEYING APPARATUS

TECHNICAL FIELD

The present invention relates to a conveying apparatus for conveying an object.

BACKGROUND ART

Various conveying apparatuses for conveying a variety of objects are known. JP 2004-315215 A discloses a conveying apparatus for conveying a vehicle body as a conveyed object.

The conveying apparatus disclosed in JP 2004-315215 A includes a support body, five guide rails and a driving mechanism. The support body supports the vehicle body. The support body is suspended from the five guide rails, each of which extends in a predetermined conveying direction. The five guide rails are aligned in a direction perpendicular to the extension directions of them. The driving mechanism for generating a driving force of moving the support body in the conveying direction is attached to the middle one of the five guide rails. The support body is connected to the middle guide rail, so that the support body may move along the middle guide rail.

The two guide rails on the left of the middle guide rail support the left half portion of the support body. These guide rails respectively support the upstream end and the downstream end of the left half portion of the support body. The upstream and downstream ends of the left half portion of the support body may move along these guide rails.

The two guide rails on the right of the middle guide rail support the right half portion of the support body. These guide rails respectively support the upstream end and the downstream end of the right half portion of the support body. The upstream and downstream ends of the right half portion of the support body may move along these guide rails.

The five guide rails are inclined obliquely downward with respect to the conveying direction, along which the object is conveyed, to form a slope section. Therefore, these guide rails may support the support body at height positions different from each other between upstream and downstream of the slope section. When the support body supported by these guide rails at a low position is conveyed in the conveying direction, an operator may easily access the vehicle body supported by the support body to perform a predetermined operation for the vehicle body. When the support body supported by these guide rails at a high position is conveyed in the conveying direction, a large space is formed below the support body and the vehicle body. The space below the support body and the vehicle body is effectively used for a variety of purposes (e.g. delivery of parts).

It may be required to form a large space in a conveying section, in which the support body has been supported at the low position, due to a layout change in a factory in which the conveying apparatus being installed. In this case, it is necessary to change height positions of the five guide rails to a higher position in the section in which the large space is required. Consequently, the slope section formed by the five guide rails is also changed into a conveying section in which five guide rails extend linearly horizontally at a predetermined height position. Alternatively, it may be necessary to change a position of a slope section in the conveying direction, or to change an inclination angle of a slope section, the slope section being formed by the five guide rails. Since the driving mechanism is attached to the middle one of the five guide rails, it becomes troublesome in particular to change a layout of the middle guide rail. For example, an operator has to remove the driving mechanism from the middle guide rail, and install a new guide rail. After that, the operator has to attach the newly installed guide rail to the driving mechanism. Therefore, it requires tremendous labor to change a conveyance path of the conventional conveying apparatus in a height direction.

An object of the present invention is to provide a conveying apparatus which enables to easily change a conveyance path in a height direction, an object being conveyed along the conveyance path.

SUMMARY OF INVENTION

A conveying apparatus according to one aspect of the present invention includes: a support body configured to support a conveyed object; a linear moving member extended at a predetermined height position and configured to move in a predetermined conveying direction; a first guide rail including a first slope section inclined in the conveying direction from a predetermined first height position to a second height position different from the first height position, and configured to support the support body which moves in the first slope section; and a transmission mechanism configured to transmit a driving force of the linear moving member to the support body when the linear moving member moves in the conveying direction. The transmission mechanism vertically extends and contracts in response to a change in vertical distance between the first guide rail and the linear moving member extended at the predetermined height position while the support body moves on the first slope section in the conveying direction with being supported by the first guide rail.

The aforementioned conveying apparatus enables to easily change a conveyance path in a height direction, an object being conveyed along the conveyance path.

These and other objects, features and advantages of the aforementioned conveying apparatus will become more apparent upon reading the following detailed description along with the accompanying drawings.

DESCRIPTION OF EMBODIMENTS

Figure 1:
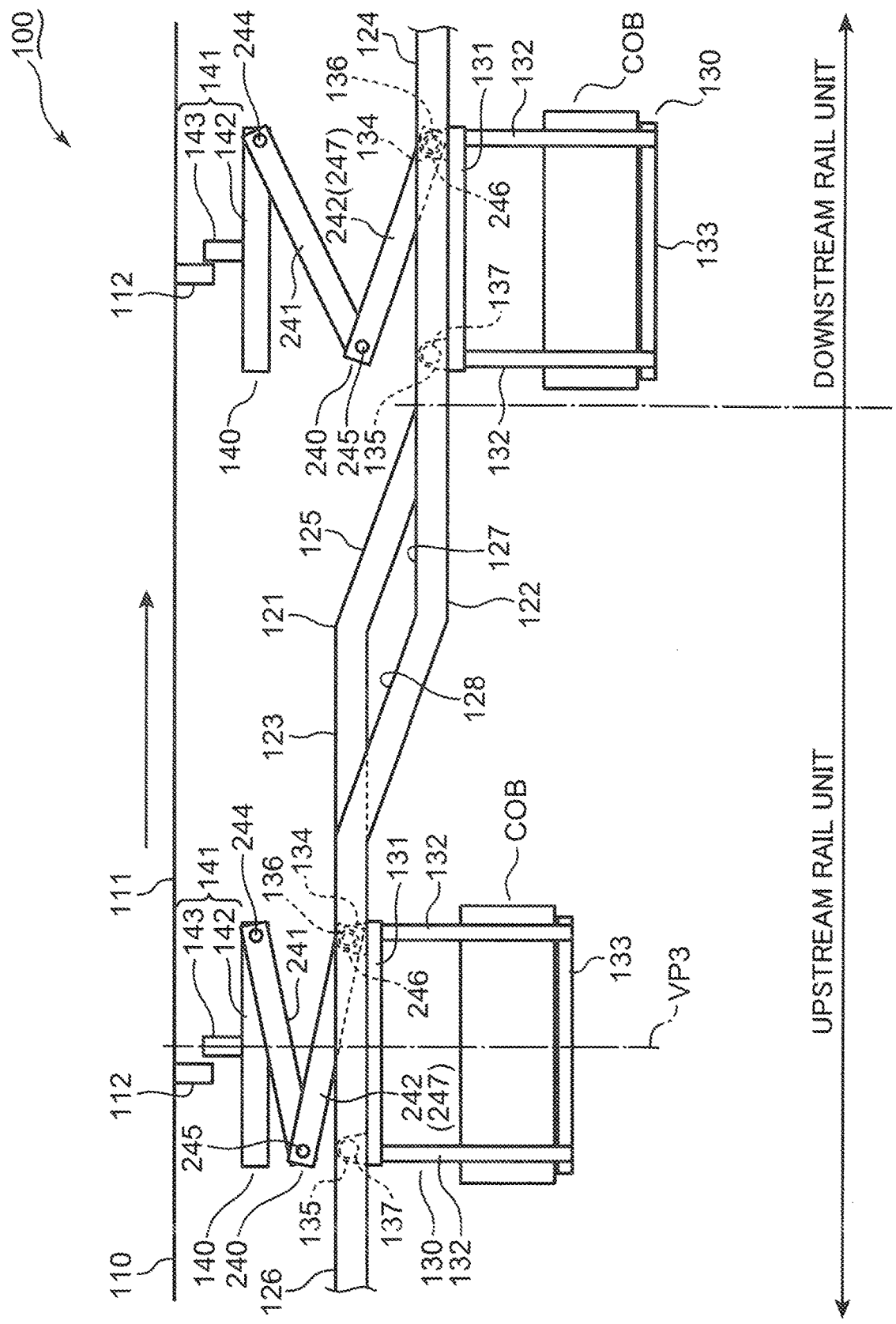
FIG. 1 is a schematic right side view of an exemplary conveying apparatus.

FIG. 1 is a schematic right side view of an exemplary conveying apparatus 100. The conveying apparatus 100 is described with reference to FIG. 1.

The conveying apparatus 100 includes a linear moving member 110, two front guide rails 121 below the linear moving member 110, two rear guide rails 122 below the linear moving member 110, support bodies 130 (FIG. 1 shows two support bodies 130) for respectively supporting conveyed objects COB (e.g. a vehicle body and other workpieces) below the front and rear guide rails 121, 122, and transmission mechanisms 140 (FIG. 1 shows two transmission mechanisms 140) respectively situated in correspondence to the support bodies 130. FIG. 1 shows a front guide rail 121 which is the right one of the two front guide rails 121. The right front guide rail 121 overlaps the left front guide rail 121. Likewise, FIG. 1 shows a rear guide rail 122 which is the right one of the two rear guide rails 122. The right rear guide rail 122 overlaps the left rear guide rail 122. The arrow in FIG. 1 indicates a conveying direction of the conveyed object COB. The terms "front", "rear", "upstream" and "downstream" are used on the basis of the conveying direction.

The linear moving member 110 gives a driving force (a forward driving force) to the transmission mechanisms 140. The forward driving force is transmitted to each of the support bodies 130 via the transmission mechanisms 140, the support bodies 130 being configured to support the conveyed objects COB. The support bodies 130 and the conveyed objects COB are supported by the two front guide rails 121 and the two rear guide rails 122, so that the support bodies 130 and the conveyed objects COB may move forward along the two front guide rails 121 and the two rear guide rails 122 in response to the forward driving force.

The linear moving member 110 includes a flexible linear member 111, and pushers 112 respectively projecting from the linear member 111 toward the transmission mechanisms 140. The linear member 111 may be a chain (e.g. a power and free chain) or a belt. The linear member 111 is substantially horizontally extended at a predetermined height position by rotating members (not shown) such as sprockets or pulleys. FIG. 1 shows a part of the linear member 111 which is substantially horizontally extended. The linear member 111 is moved forward by a driving force generated by a driving device (not shown: e.g. a motor) connected to one of the rotating members. The pushers 112 are moved forward together with the linear member 111.

Figure 2:
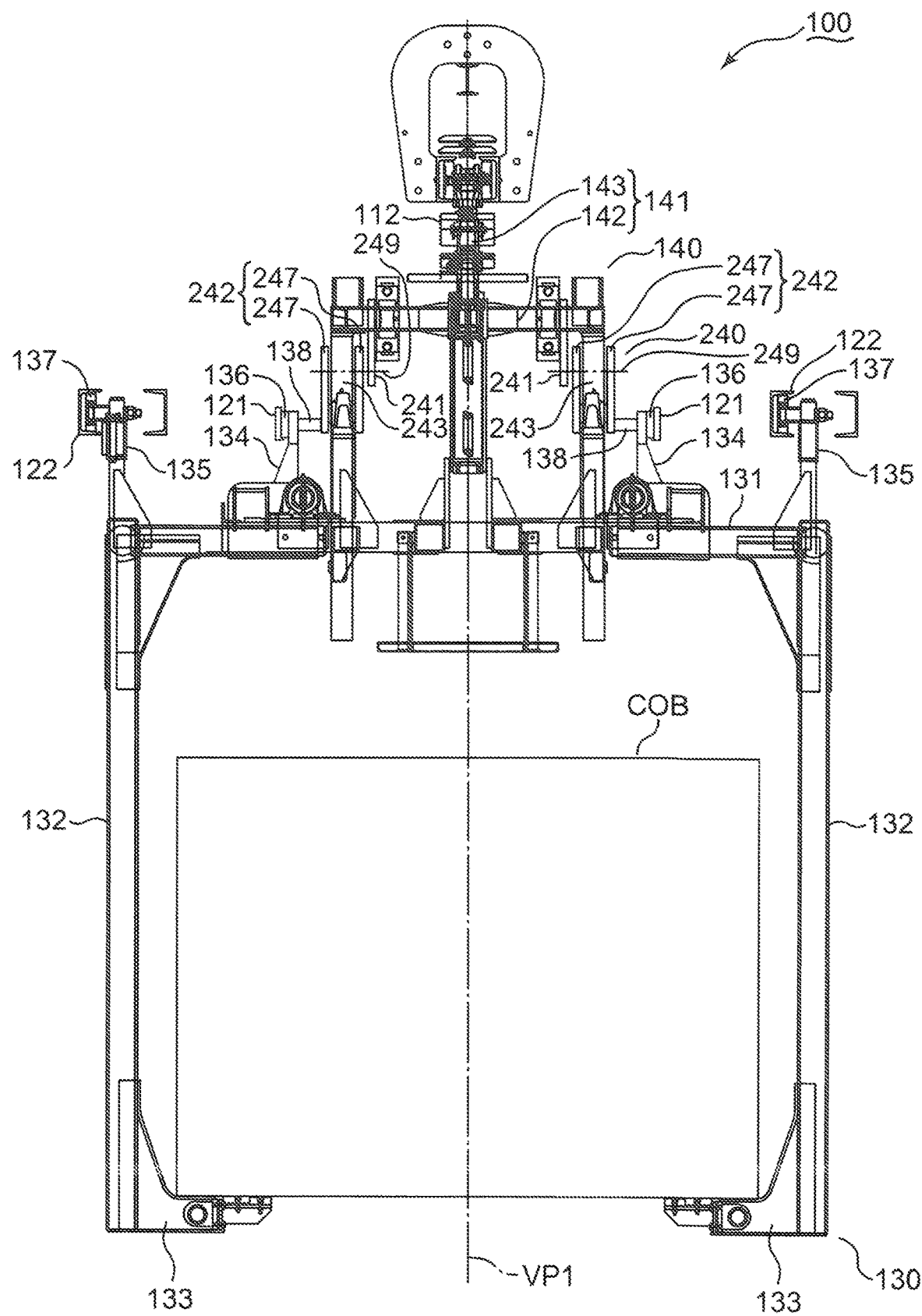
FIG. 2 is a schematic rear view of the conveying apparatus shown in FIG. 1.

FIG. 2 is a schematic rear view of the conveying apparatus 100. The transmission mechanism 140 and the support body 130 are described with reference to FIGS. 1 and 2.

As shown in FIG. 1, the transmission mechanism 140 includes a base portion 141 configured to receive the driving force of the linear member 111 of the linear moving member 110. The base portion 141 includes a horizontal plate portion 142, and a projecting piece 143 which projects upward from the horizontal plate portion 142. The horizontal plate portion 142 is a plate member having a substantially horizontal upper surface and a substantially horizontal lower surface. The horizontal plate portion 142 is held by a predetermined retaining mechanism (not shown: e.g. connection members configured to connect the pusher 112 or a rail extending horizontally in the conveying direction with the horizontal plate portion 142) so that a distance from the linear member 111 remains unchanged. The projecting piece 143 projecting upward from the upper surface of the horizontal plate portion 142 overlaps the pusher 112 of the linear moving member 110 in the conveying direction of the conveyed object COB. When the pusher 112 is moved forward, the projecting piece 143 is pushed forward. Consequently, the forward driving force is transmitted to the horizontal plate portion 142 via the projecting piece 143. Meanwhile, the horizontal plate portion 142 may move forward with keeping a substantially fixed distance from the linear member 111.

The transmission mechanism 140 further includes an extension/contraction mechanism 240 configured to vertically extend and contract. The extension/contraction mechanism 240 is connected to the base portion 141 and the support body 130. Since the extension/contraction mechanism 240 vertically extends and contracts even when there is a change in height of the support body 130, the connection between the extension/contraction mechanism 240 and the support body 130 is maintained. Since the extension/contraction mechanism 240 is connected to the base portion 141 even when there is a change in height of the support body 130, the forward driving force of the base portion 141 is transmitted to the support body 130 via the extension/contraction mechanism 240. Consequently, the two support bodies 130 shown in FIG. 1 may move in the conveying direction at height positions different from each other. Before description about a structure of the extension/contraction mechanism 240, the support body 130 situated underneath the transmission mechanism 140 is described below.

The support body 130 includes a substantially rectangular upper frame plate 131, and four vertical frames 132 extending downward from the upper frame plate 131. The upper frame plate 131 includes a pair of edges extending in the conveying direction and a pair of edges orthogonal to the conveying direction. The upper frame plate 131 is symmetrical with respect to an imaginary vertical plane VP1 (c.f. FIG. 2) expanding along the linear moving member 110. The four vertical frames 132 extend downward from the four corners of the upper frame plate 131.

As shown in FIG. 2, the support body 130 further includes two hook members 133 attached to the four vertical frames 132, the two hook members 133 being configured to support the conveyed objects COB. One of the two hook members 133 is attached to the lower ends of the two vertical frames 132 situated on the right of the vertical plane VP1, and projects leftward from these vertical frames 132. The other of the two hook members 133 is attached to the lower ends of the two vertical frames 132 situated on the left of the vertical plane VP1, and projects rightward from these vertical frames 132.

A structure of the support body 130 formed above the upper frame plate 131 is further described. The support body 130 further includes two front brackets 134, two rear brackets 135, two front rollers 136, two rear rollers 137 and two shafts 138 (c.f. FIG. 2). The two front brackets 134 respectively hold the two front rollers 136 at positions upwardly away from the upper frame plate 131. The two front rollers 136 are respectively connected to the two front guide rails 121. In addition, the two front rollers 136 are respectively connected to the extension/contraction mechanism 240 of the transmission mechanism 140 by the two shafts 138. The two shafts 138 form a transmission path to the two front rollers 136 for transmitting the driving force which has been transmitted from the linear moving member 110 to the transmission mechanism 140. The two rear brackets 135 respectively hold the two rear rollers 137 at positions upwardly away from the upper frame plate 131. The two rear rollers 137 are attached to the two rear brackets 135 and connected to the rear guide rails 122.

The two front brackets 134 project upward from the upper surface of the upper frame plate 131 at positions near the front edge of the upper frame plate 131 (the edge intersecting with the vertical plane VP1 at the downstream position in the conveying direction). These front brackets 134 are symmetrical with respect to the vertical plane VP1. Since the two front brackets 134 project upward from the upper surface of the upper frame plate 131, the two front rollers 136 respectively attached to these front brackets 134 are connected to the two front guide rails 121 at positions upwardly away from the upper frame plate 131. Therefore, the two front rollers 136 may roll along the two front guide rails 121.

The two rear brackets 135 project upward from the upper surface of the upper frame plate 131 at positions near the rear edge of the upper frame plate 131 (the edge intersecting with the vertical plane VP1 at the upstream position in the conveying direction). These rear brackets 135 are symmetrical with respect to the vertical plane VP1. Since the two rear brackets 135 project upward from the upper surface of the upper frame plate 131, the two rear rollers 137 respectively attached to these rear brackets 135 are connected to the two rear guide rails 122 at positions upwardly away from the upper frame plate 131. Therefore, the two rear rollers 137 may roll along the two rear guide rails 122. Height positions of the two rear rollers 137 substantially coincide with height positions of the two front rollers 136. With regard to the present embodiment, one of the front and rear rollers 136, 137 corresponds to the first moving body whereas the other of the front and rear rollers 136, 137 corresponds to the second moving body.

With regard to transmission of the driving force in the support body 130, the two shafts 138 transmit the forward driving force not only to the two front rollers 136 but also to the two front brackets 134. Thereafter, the driving force is transmitted to the two rear rollers 137, the two rear brackets 135, the four vertical frames 132 and the two hook members 133 via the upper frame plate 131.

A portion of the conveying apparatus 100 connected to the two front rollers 136 and the two rear rollers 137 (i.e. the two front brackets 134, the two rear brackets 135, the upper frame plate 131, the four vertical frames 132 and the two hook members 133) constitutes a placement portion on which the conveyed object COB is placed. The driving force is transmitted to the conveyed object COB via the placement portion.

The front and rear guide rails 121, 122 for respectively guiding the front and rear rollers 136, 137 are described below.

As shown in FIG. 1, the front guide rail 121 includes two horizontal rail portions 123, 124, and a slope rail portion 125 which forms a slope section between these horizontal rail portions 123, 124. The two horizontal rail portions 123, 124 extend substantially horizontally in the conveying direction below the linear moving member 110 (i.e. at a lower left position or a lower right position). In short, these horizontal rail portions 123, 124 are substantially in parallel to the linear member 111 of the linear moving member 110. The horizontal rail portion 124 is situated downstream of the horizontal rail portion 123 in the conveying direction. In addition, the horizontal rail portion 124 extends substantially horizontally at a height position lower than a height position at which the horizontal rail portion 123 extends substantially horizontally. The slope rail portion 125 forms a slope section extending from the downstream end of the horizontal rail portion 123 to the upstream end of the horizontal rail portion 124. The height position of the horizontal rail portion 123 corresponds to one of the first and second height positions. The height position of the horizontal rail portion 124 corresponds to the other of the first and second height positions.

Like the front guide rail 121, the rear guide rail 122 includes two horizontal rail portions 126, 127, and a slope rail portion 128 which forms a slope section between these horizontal rail portions 126, 127. The horizontal rail portion 126 of the rear guide rail 122 extends in the conveying direction substantially at the same height position as the horizontal rail portion 123 of the front guide rail 121. The horizontal rail portion 127 of the rear guide rail 122 extends substantially at the same height position as the horizontal rail portion 124 of the front guide rail 121. Therefore, like the horizontal rail portions 123, 124 of the front guide rail 121, the horizontal rail portions 126, 127 of the rear guide rail 122 are substantially in parallel to the linear member 111 of the linear moving member 110. The horizontal rail portion 127 is situated downstream of the horizontal rail portion 126. The slope rail portion 128 forms a slope section extending from the downstream end of the horizontal rail portion 126 to the upstream end of the horizontal rail portion 127. With regard to the present embodiment, one of the front and rear guide rails 121, 122 corresponds to the first guide rail. The other of the front and rear guide rails 121, 122 corresponds to the second guide rail.

A connection portion of the horizontal rail portion 126 and the slope rail portion 128 of the rear guide rail 122 is situated upstream with respect to a connection portion of the horizontal rail portion 123 and the slope rail portion 125 of the front guide rail 121. The positional difference between these connection portions in the horizontal direction substantially coincides with a positional difference between the front and rear rollers 136, 137 in the horizontal direction. Therefore, when the front roller 136 reaches the connection portion of the horizontal rail portion 123 and the slope rail portion 125 of the front guide rail 121, the rear roller 137 also reaches the connection portion of the horizontal rail portion 126 and the slope rail portion 128 of the rear guide rail 122.

Likewise, a connection portion of the slope rail portion 128 and the horizontal rail portion 127 of the rear guide rail 122 is situated upstream with respect to a connection portion of the slope rail portion 125 and the horizontal rail portion 124 of the front guide rail 121. The positional difference between these connection portions in the horizontal direction substantially coincide with the positional difference between the front and rear rollers 136, 137 in the horizontal direction. Therefore, when the front roller 136 reaches the connection portion of the slope rail portion 125 and the horizontal rail portion 124 of the front guide rail 121, the rear roller 137 also reaches the connection portion of the slope rail portion 128 and the horizontal rail portion 127 of the rear guide rail 122.

The slope rail portion 128 of the rear guide rail 122 is substantially in parallel to the slope rail portion 125 of the front guide rail 121. In short, an inclination angle of the slope rail portion 128 of the rear guide rail 122 substantially coincides with an inclination angle of the slope rail portion 125 of the front guide rail 121. A slope section formed by one of the slope rail portions 125, 128 of the front and rear guide rails 121, 122 corresponds to the first slope section. A slope section formed by the other of the slope rail portions 125, 128 corresponds to the second slope section.

With regard to a positional relationship in height between the front and rear rollers 136, 137 which roll along the front and rear guide rails 121, 122, since the height positions of the horizontal rail portions 123, 126 of the front and rear guide rails 121, 122 are substantially equivalent to each other, height positions of the front and rear rollers 136, 137 which roll along the horizontal rail portions 123, 126 become substantially equivalent to each other. Since the inclination angles of the slope rail portion 125, 128 of the front and rear guide rails 121, 122 are substantially equivalent to each other, height positions of the front and rear rollers 136, 137 which have transferred from the horizontal rail portion 123, 126 to the slope rail portion 125, 128 also become substantially equivalent to each other. Since the height positions of the horizontal rail portion 124, 127 extending downstream from the slope rail portion 125, 128 are substantially equivalent to each other, height positions of the front and rear rollers 136, 137 which have transferred from the slope rail portion 125, 128 to the horizontal rail portion 124, 127 also become substantially equivalent to each other. Consequently, postures of the two hook members 133 connected to the front and rear rollers 136, 137 via the two front brackets 134, the two rear brackets 135, the upper frame plate 131 and the four vertical frames 132 are kept in a substantially fixed state while the front and rear rollers 136, 137 respectively move along the front and rear guide rails 121, 122. Likewise, the conveyed object COB which is supported by the hook members 133 is kept in a substantially fixed state while the front and rear rollers 136, 137 respectively move along the front and rear guide rails 121, 122.

A unified structure of the front and rear guide rails 121, 122 is described below. The front and rear guide rails 121, 122 are unified over a predetermined extension section to form a rail unit. FIG. 1 shows that the front and rear guide rails 121, 122 are unified in a section which is upstream with respect to the downstream end of the slope rail portion 125 of the front guide rail 121 to form an upstream rail unit. In short, the upstream rail unit is constituted by the slope rail portion 125 and the horizontal rail portion 123 of the front guide rail 121, the slope rail portion 128, the horizontal rail portion 126 and a part of the horizontal rail portion 127 of the rear guide rail 122. Likewise, the front and rear guide rails 121, 122 are unified in a section which is downstream with respect to the downstream end of the slope rail portion 125 of the front guide rail 121 to form a downstream rail unit. In short, the downstream rail unit is constituted by the horizontal rail portion 124 of the front guide rail 121 and a part of the horizontal rail portion 127 of the rear guide rail 122. It is possible to separate the upstream rail unit from the downstream rail unit on an imaginary vertical plane orthogonal to the linear member 111 of the linear moving member 110.

(Structure of Extension/Contraction Mechanism)

Figure 3:
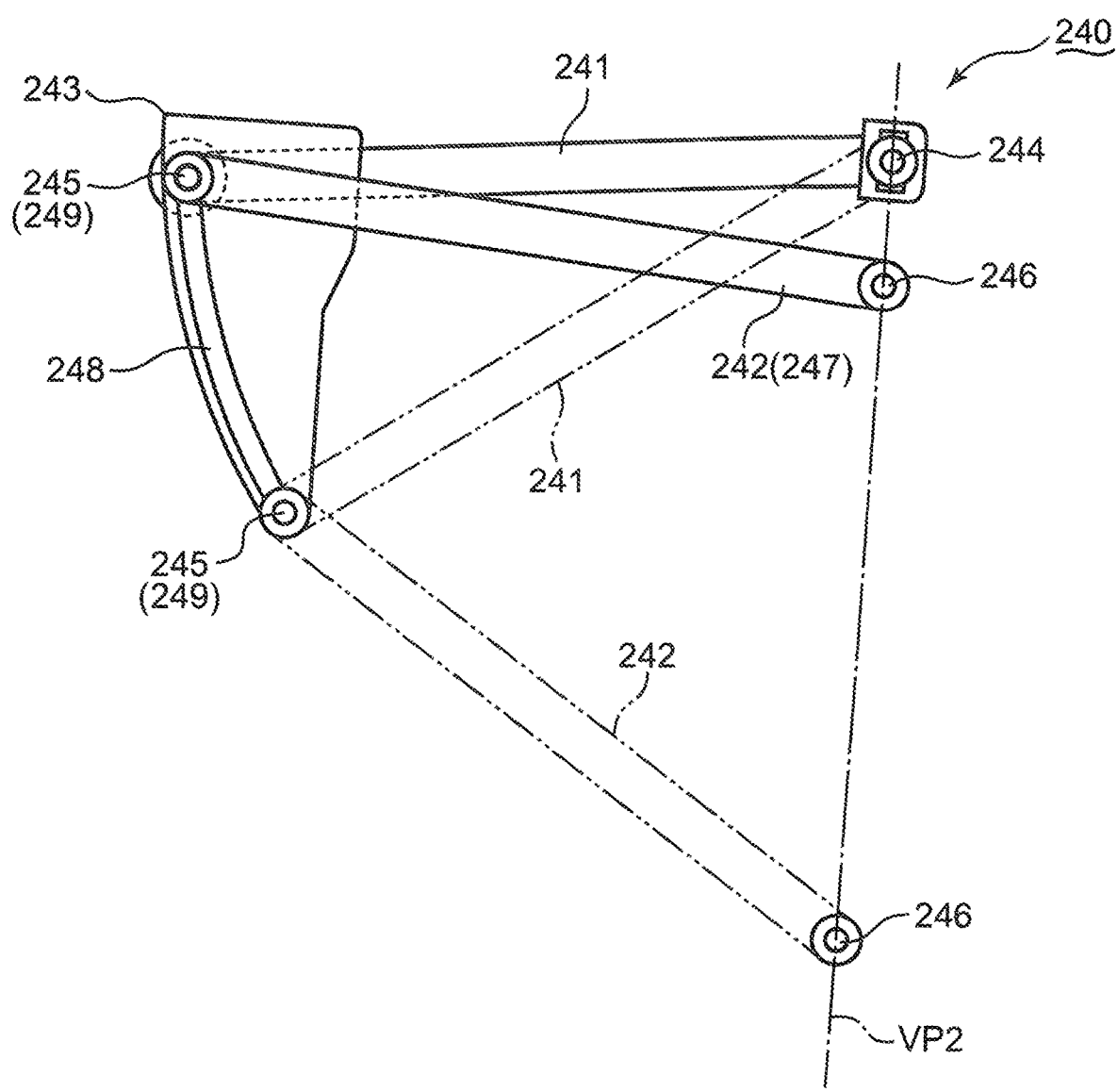
FIG. 3 is a schematic view of an extension/contraction mechanism of the conveying apparatus shown in FIG. 1.

FIG. 3 is a schematic view of the extension/contraction mechanism 240. The extension/contraction mechanism 240 is described with reference to FIGS. 1 to 3. The solid lines in FIG. 3 show a state in which the extension/contraction mechanism 240 maximally contracts. The chain lines in FIG. 3 show a state in which the extension/contraction mechanism 240 maximally extends.

As shown in FIGS. 2 and 3, the extension/contraction mechanism 240 includes two first arms 241 extending from the base portion 141, two second arms 242 respectively extending from these first arms 241, and two slot members 243 respectively connected to the two second arms 242. The two first arms 241 transmit the forward driving force from the base portion 141 to the two second arms 242. The two second arms 242 transmit the forward driving force to the support body 130. The slot member 243 is a plate-shaped member formed so as to guide a connection portion of the first and second arms 241, 242.

As shown in FIG. 2, the two first arms 241 are symmetrical with respect to the vertical plane VP1. Likewise, the two second arms 242 are symmetrical with respect to the vertical plane VP1. The two first arms 241 are situated between the two second arms 242.

As shown in FIG. 1, the proximal end of the first arm 241 is connected to the horizontal plate portion 142 of the base portion 141 near the downstream end of the base portion 141 to form a first hinged joint 244 in cooperation with the horizontal plate portion 142. The first arm 241 is rotatable around the first hinged joint 244 to be swung in the vertical direction. The first arm 241 extends obliquely downward from the first hinged joint 244 in the upstream direction.

The proximal end of the second arm 242 is connected to the distal end of the first arm 241 to form a second hinged joint 245 in cooperation with the distal end of the first arm 241. The second arm 242 is rotatable around the second hinged joint 245 to be swung in the vertical direction. The second arm 242 extends obliquely downward from the second hinged joint 245 in the downstream direction so as to bend from the first arm 241.

The distal end of the second arm 242 is connected to the shaft 138 (c.f. FIG. 2) of the support body 130 to form a third hinged joint 246 in cooperation with the shaft 138. The third hinged joint 246 is situated on an imaginary vertical plane VP2 (see FIG. 3) orthogonal to the linear member 111 of the linear moving member 110, the imaginary vertical plane VP2 expanding downward from the first hinged joint 244.

As shown in FIG. 2, each of the two second arms 242 includes two arm plates 247 situated substantially in parallel to each other, and a rod-shaped inserting portion 249 for connecting these arm plates 247. The two arm plates 247 are situated so as to sandwich the slot member 243. As shown in FIG. 3, a slot 248 extending in an arc shape is formed in the slot member 243. The inserting portion 249 is inserted in the slot 248. The inserting portion 249 is guided in the slot 248 to move along an arc-shaped locus defined by the slot 248 while the extension/contraction mechanism 240 moves in the vertical direction. The slot member 243 extends downward from the lower surface of the horizontal plate portion 142 of the base portion 141. Since the slot member 243 is fixed to the lower surface of the horizontal plate portion 142, a positional relationship between the base portion 141 and the slot member 243 remains unchanged while the inserting portion 249 moves along the slot 248. Therefore, it is possible to stably guide the inserting portion 249 with the slot member 243.

The inserting portion 249 extends through not only the two arm plates 247 of the second arm 242 but also the first arm 241 to form the second hinged joint 245 (c.f. FIG. 2: FIG. 2 shows the inserting portion 249 by a straight line). Therefore, a moving locus of the inserting portion 249 (i.e. the extension shape of the slot 248) corresponds to a moving locus of the second hinged joint 245.

A positional relationship among the first to third hinged joints 244, 245, 246 is described with reference to FIG. 1.

FIG. 1 shows an imaginary vertical plane VP3 orthogonal to the linear member 111 of the linear moving member 110 at an intermediate position between the front and rear rollers 136, 137. The first and third hinged joints 244, 246 are formed on the downstream side with respect to the vertical plane VP3 whereas the second hinged joint 245 is formed on the upstream side with respect to the vertical plane VP3.

As described above, each of the first to third hinged joints 244, 245, 246 is formed at the end portions of the first and second arms 241, 242. As shown in FIG. 1, the first and second arms 241, 242 are formed to be slightly longer than the horizontal distance between the front and rear rollers 136, 137. Therefore, positions of the first to third hinged joints 244, 245, 246 are set so that a horizontal distance between the first and second hinged joints 244, 245 and a horizontal distance between the third and second hinged joints 246, 245 become substantially equal to the horizontal distance between the front and rear rollers 136, 137.

(Extension and Contraction Operation of Extension/Contraction Mechanism)

An extension and contraction operation of the extension/contraction mechanism 240 is described with reference to FIG. 1.

As described above, the horizontal plate portion 142 of the base portion 141 may move in the conveying direction with keeping a substantially fixed distance from the linear member 111 of the linear moving member 110. Therefore, the first hinged joint 244 formed on the horizontal plate portion 142 may move in the conveying direction with keeping a substantially fixed distance from the linear member 111. On the other hand, since the third hinged joint 246 below the first hinged joint 244 is connected via the shaft 138 to the front roller 136 which roll along the front guide rail 121, a vertical distance between the third and first hinged joints 246, 244 is gradually increased while the front roller 136 moves from the upstream end of the slope rail portion 125 (i.e. the end of the slope rail portion 125 connected to the horizontal rail portion 123) to the downstream end of the slope rail portion 125 (i.e. the end of the slope rail portion 125 connected to the horizontal rail portion 124). During the movement, the second hinged joint 245 moves along the arc-shaped slot 248 formed in the slot member 243. Since the slot 248 is formed so that the positional relationship in the horizontal direction between the first and third hinged joints 244, 246 remains unchanged, the third hinged joint 246 may displace downward along the vertical plane VP2.

During the downward displacement of the third hinged joint 246 along the vertical plane VP2, an angle defined by the first and second arms 241, 242 at the second hinged joint 245 is gradually increased. On the other hand, when the angle defined by the first and second arms 241, 242 decreases at the second hinged joint 245, the third hinged joint 246 moves up along the vertical plane VP2. In short, the extension/contraction mechanism 240 may change the vertical distance between the third and first hinged joints 246, 244 with changing the angle defined by the first and second arms 241, 242 at the second hinged joint 245 (i.e. the extension/contraction mechanism 240 may extend and contract in the vertical direction).

As shown in FIG. 3, when the extension/contraction mechanism 240 maximally contracts, the second hinged joint 245 is situated at the upper end of the slot 248. When the extension/contraction mechanism 240 maximally extends, the second hinged joint 245 is situated at the lower end of the slot 248. In short, the vertical stroke length of the extension/contraction mechanism 240 (i.e. a difference between a maximum value and a minimum value of a vertical distance from the first hinged joint 244 to the third hinged joint 246) is determined by the slot 248. Therefore, the vertical stroke length of the extension/contraction mechanism 240 is easily changed merely by changing an opening length of the slot 248.

(Conveying Operation of Conveying Apparatus and Change of Conveyance Path)

An operation of the conveying apparatus 100 is described with reference to FIGS. 1 and 2.

An operator may place the conveyed object COB onto the hook members 133. Then, the conveying apparatus 100 may support the conveyed object COB. When the front and rear rollers 136, 137 are supported by the horizontal rail portions 123, 126, the conveyed object COB is held at a relatively high position. Therefore, a relatively large space is formed below the conveyed object COB. The large space below the conveyed object COB is effectively used for other purposes (e.g. delivery of parts).

When the pusher 112 of the linear moving member 110 is moved forward, the pusher 112 is abutted against the projecting piece 143 of the transmission mechanism 140 and pushes the projecting piece 143 forward. Consequently, the forward driving force of the pusher 112 is transmitted from the linear moving member 110 to the transmission mechanism 140. Since the transmission mechanism 140 is connected to the front rollers 136 via the shafts 138 (c.f. FIG. 2), the forward driving force is transmitted to the front rollers 136. Consequently, the front rollers 136 may move substantially horizontally along the horizontal rail portions 123 of the front guide rails 121. Like the front rollers 136, since the rear rollers 137 are attached to the upper frame plate 131, the rear rollers 137 may move forward along the horizontal rail portions 126 of the rear guide rails 122 as the front rollers 136 are moved forward. Consequently, the support body 130 may move horizontally with stably holding the conveyed object COB at a relatively high position until the front rollers 136 reach the upstream ends of the slope rail portions 125 of the front guide rails 121.

The difference in horizontal position between the front and rear rollers 136, 137 substantially coincides with the difference in horizontal position between the upstream ends of the slope rail portion 125, 128 of the front and rear guide rails 121, 122. Therefore, the rear rollers 137 may reach the upstream ends of the slope rail portions 128 of the rear guide rails 122 substantially at the same time as the front rollers 136 arriving at the upstream ends of the slope rail portions 125 of the front guide rails 121. Since the slope rail portions 125, 128 are substantially in parallel, a relative positional relationship between the front and rear rollers 136, 137 which move along the slope rail portions 125, 128 may retain a relative positional relationship between the front and rear rollers 136, 137 which move along the horizontal rail portions 123, 126. Therefore, like when the front and rear rollers 136, 137 move along the horizontal rail portions 123, 126, the conveying apparatus 100 may stably hold the conveyed object COB even when the front and rear rollers 136, 137 move along the slope rail portions 125, 128.

The front and rear rollers 136, 137 moving along the slope rail portions 125, 128 gradually move down whereas the horizontal plate portion 142 connected to the proximal ends of the first arms 241 of the extension/contraction mechanism 240 move substantially horizontally. Therefore, there is a gradual increase in vertical distance between the first hinged joint 244, which is formed by the horizontal plate portion 142 and the proximal end of the first arm 241, and the third hinged joint 246, which is coaxial with the front rollers 136. Consequently, the angle defined by the first and second arms 241, 242 at the second hinged joint 245 is gradually increased, so that the extension/contraction mechanism 240 may extend downward. As a result of the downward extension of the extension/contraction mechanism 240, the connection between the extension/contraction mechanism 240 and the front rollers 136 is retained even when the front and rear rollers 136, 137 move along the slope rail portions 125, 128. Therefore, the forward driving force of the linear member 111 is continuously transmitted to the front rollers 136 via the base portion 141 and the extension/contraction mechanism 240.

The difference in horizontal position between the downstream ends of the slope rail portion 125, 128 of the front and rear guide rail 121, 122 also substantially coincides with the difference in horizontal position between the front and rear rollers 136, 137. Therefore, the rear rollers 137 may reach the downstream ends of the slope rail portions 128 of the rear guide rails 122 substantially at the same time as the front rollers 136 arriving at the downstream ends of the slope rail portions 125 of the front guide rails 121. The front and rear rollers 136, 137 may then move downstream along the horizontal rail portions 124, 127 extending from the downstream ends of the slope rail portions 125, 128. Since the horizontal rail portions 124, 127 are respectively situated below the upstream horizontal rail portions 123, 126, the object COB may be conveyed at a relatively low position while the front and rear rollers 136, 137 move along the horizontal rail portions 124, 127. Therefore, an operator may easily access the conveyed object COB to perform a desired operation for the conveyed object COB.

When there is a change in working procedures for the conveyed object COB so that a long period is required for an operation for the conveyed object COB, design of a conveyance path of the conveyed object COB may be changed so as to extend a length of a section in which the object COB is conveyed with being held at a low position. In this case, an operator may remove the upstream rail unit from the downstream rail unit, and mount a new rail unit in the section in which the upstream rail unit has been removed. When the new rail unit extends substantially horizontally in the upstream direction from each of the horizontal rail portions 124, 127, there is an increase in length of a section in which the object COB is conveyed with being held at a low position.

Unlike conventional arts, a height position at which the support body 130 is supported is exclusively determined by the front and rear guide rails 121, 122, so that the linear member 111 of the linear moving member 110 extending substantially horizontally at a predetermined height position is irrelevant to the setting of the height position at which the support body 130 is supported. Therefore, construction for the linear member 111 is not required even when there is a change of a conveyance path but the conveyance path is changed by exchanging an upstream rail unit without disconnection from the drive source for generating the driving force. Therefore, the conveyance path is advantageously easily changed as compared with the conventional arts.

With regard to a change of a conveyance path of the conveyed object COB, there may be an increase in difference between two height positions at which the conveyed object COB is held. Unlike the conventional arts, the length of each of the first and second arms 241, 242 is longer than the difference in horizontal position between the front and rear rollers 136, 137. Therefore, it is possible to set the maximum stroke length of the extension/contraction mechanism 240 to a large value. Accordingly, there may be an increase in difference between two height positions at which the conveyed object COB is held without construction for the linear member 111. Since the first and third hinged joints 244, 246 are situated near the downstream end of the support body 130 whereas the second hinged joint 245 is situated near the upstream end of the support body 130 as shown in FIG. 1, the first and second arms 241, 242 are folded in a space between the support body 130 and the base portion 141 without excessively projecting from the support body 130 in the upstream and downstream directions although the lengths of the first and second arms 241, 242 are great.

With regard to the aforementioned embodiment, the conveying apparatus 100 shown in FIG. 1 conveys two objects COB. Alternatively, the conveying apparatus 100 may convey three or more objects COB, or may convey one object COB.

With regard to the aforementioned embodiment, the conveying apparatus 100 shown in FIG. 1 changes a support position of the conveyed object COB from a high position to a low position. Alternatively, the support position of the conveyed object COB may be changed from a low position to a high position.

With regard to the aforementioned embodiment, the front and rear rollers 136, 137 which roll along the front and rear guide rail 121, 122 is used as the first and second moving bodies. Alternatively, the first and second moving bodies may be slidably moved in the conveying direction on the front and rear guide rails 121, 122 without rolling on the front and rear guide rails 121, 122.

With regard to the aforementioned embodiment, the transmission mechanism 140 extends and contracts in the vertical direction by the extension/contraction mechanism 240 including the first and second arms 241, 242. Alternatively, an existing extension/contraction mechanism configured to extend and contract in the vertical direction may be incorporated in a transmission mechanism. The principles of the aforementioned embodiment are not limited to a specific extension/contraction mechanism incorporated in a transmission mechanism.

With regard to the aforementioned embodiment, the extension/contraction mechanism 240 is designed so that the first and third hinged joints 244, 246 are situated downstream of the vertical plane VP3 whereas the second hinged joint 245 is situated upstream of the vertical plane VP3 (c.f. FIG. 1). Alternatively, first and third hinged joints may be situated upstream of the vertical plane VP3 whereas a second hinged joint may be situated downstream of the vertical plane VP3. In this case, the extension/contraction mechanism is not connected to the front rollers 136 but to the rear rollers 137.

With regard to the aforementioned embodiment, the linear moving member 110 is extended above the front and rear guide rails 121, 122. Alternatively, a linear moving member may be extended below the front and rear guide rails 121, 122. For example, a conveying apparatus may have a structure such that the layout shown in FIG. 1 is made upside down.

With regard to the aforementioned embodiment, the horizontal rail portions 123, 126 of the front and rear guide rails 121, 122 are situated substantially at the same height positions. In addition, the horizontal rail portions 124, 127 of the front and rear guide rails 121, 122 are also situated substantially at the same height positions. Alternatively, the horizontal rail portions 123, 126 may be situated at different height positions. In this case, the rear guide rail 122 is designed so that a difference in height between the horizontal rail portions 123, 124 becomes substantially equal to a difference in height between the horizontal rail portions 126, 127.

The conveying apparatus described in the context of the aforementioned embodiment mainly includes the following features.

A conveying apparatus according to one aspect of the aforementioned embodiment includes: a support body configured to support a conveyed object; a linear moving member extended at a predetermined height position and configured to move in a predetermined conveying direction; a first guide rail including a first slope section inclined in the conveying direction from a predetermined first height position to a second height position different from the first height position, and configured to support the support body which moves in the first slope section; and a transmission mechanism configured to transmit a driving force of the linear moving member to the support body when the linear moving member moves in the conveying direction. The transmission mechanism vertically extends and contracts in response to a change in vertical distance between the first guide rail and the linear moving member extended at the predetermined height position while the support body moves on the first slope section in the conveying direction with being supported by the first guide rail.

According to the aforementioned configuration, when the support body is moved in the conveying direction on the first slope section formed by the first guide rail with being supported by the first guide rail, a height position at which the support body is supported is changed from the first height position to the second height position different from the first height position. Unlike the first guide rail contributing to a change in height position at which the support body is supported, the linear moving member does not contribute to setting of a height position at which a support body is supported since the linear moving member is extended at the predetermined height position. Therefore, it is not necessary to exchange the linear moving member when a height position at which the support body is supported is changed. Since it is not necessary to exchange the linear moving member which works as a source for giving a driving force to the support body in the conveying direction, the change of a height position at which the support body is supported does not requires excessive labor. In short, when it is required to change an inclination angle of a conveyance path of the conveyed object or a position in a conveying direction of a slope section of a conveyance path, an operator may exchange the first guide rail with another guide rail without exchanging the linear moving member.

The first guide rail supports the support body which moves on the first slope section whereas the first guide rail does not have to be connected to a portion for generating the driving force since a driving force for moving the support body in the first slope section is supplied from the linear moving member. Since it is not necessary to disconnect the first guide rail from a portion for generating the driving force, it becomes easy to exchange the first guide rail.

Since the first guide rail has the first slope section inclined from the first height position to the second height position, a vertical distance between the first guide rail and the linear moving member extended at the predetermined height position changes over the first slope section. Since the transmission mechanism vertically extends and contracts in response to the change in vertical distance between the first guide rail and the linear moving member, the support body is moved in the conveying direction with being supported by the first guide rail in the first slope section. Therefore, the transmission mechanism may transmit the driving force of the linear moving member to the support body even when there is a change in height position of the support body.

With regard to the aforementioned configuration, the conveying apparatus may further include a second guide rail configured to form a second slope section at a position away from the first slope section by a predetermined horizontal distance which is set in the conveying direction, the second slope section being inclined in the conveying direction by a difference in height between the first and second height positions. The support body may include: a first moving body configured to move along the first guide rail; a second moving body situated at a position away from the first moving body by the horizontal distance, and configured to move along the second guide rail; and a placement portion connected to the first and second moving bodies, the conveyed object being placed on the placement portion. An inclination angle of the second slope section is set so that a posture of the placement portion remains unchanged while the first moving body moves in the first slope section.

According to the aforementioned configuration, since the second moving body of the support body is situated at a position away from the first moving body by the predetermined horizontal distance and is moved along the second guide rail when the first moving body moves along the first guide rail, the support body is connected to the first and second guide rails at two positions different from each other in the horizontal direction. Therefore, the support body is stably supported by the first and second guide rails.

The second guide rail forms the second slope section at a position away from the first slope section in the conveying direction by a horizontal distance in correspondence to the horizontal distance between the first and second moving bodies, the second slope section being inclined in the conveying direction by a difference in height between the first and second height positions. Therefore, when the first moving body enters the first slope section, the second moving body may enter the second slope section. When the first moving body gets out from the first slope section, the second moving body may get out from the second slope section.

Since the inclined angle of the second slope section is set so that a posture of the placement portion remains unchanged while the first moving body moves on the first slope section, when the first and second moving bodies move along the first and second slope sections respectively, the posture of the placement portion substantially remains unchanged. Therefore, the posture of the conveyed object which is placed on the placement portion is also stabilized.

With regard to the aforementioned configuration, the transmission mechanism may include: a base portion configured to receive the driving force of the linear moving member; a first arm configured to form a first hinged joint in cooperation with the base portion, and extend obliquely downward from the first hinged joint; and a second arm configured to form a second hinged joint as a connection point with the first arm and extend obliquely downward from the second hinged joint in a direction, in which the second arm is bent from the first arm, the second arm forming a third hinged joint in cooperation with the support body. The transmission mechanism may vertically extend and contract with changing an angle defined by the first and second arms at the second hinged joint. Each of the first and second arms is longer than the horizontal distance.

Since a horizontal distance between the first and second moving bodies of the support body contributes to stabilizing a posture of the support body as described above, it is preferable that the horizontal distance is set to a large value. According to the aforementioned configuration, each of the first and second arms is longer than the horizontal distance between the first and second moving bodies. Therefore, a distance between the first and second hinged joints and a distance between the second and third hinged joints are also set to a large value.

A change in angle defined by the first and second arms results in a change in distance between the first hinged joint, which is formed by the base portion and the first arm extending obliquely downward from the base portion, and the third hinged joint, which is formed by the support body and the second arm extending obliquely downward from the second hinged joint that is formed as a connection point of the first and second arms. In short, the transmission mechanism may extend and contract in the vertical direction. An amount of change in distance between the first and third hinged joints due to a change in angle defined by the first and second arms (i.e. a stroke length of the transmission mechanism in the vertical direction) becomes proportional to the distance between the first and second hinged joints and the distance between the second and third hinged joints. As described above, since the distance between the first and second hinged joints and the distance between the second and third hinged joints are set to large values, the maximum stroke length of the transmission mechanism is also set to a large value. Therefore, even when there is a large difference between the first and second height positions, the transmission mechanism may sufficiently extend to transmit a driving force of the linear moving member to the support body while the first and second moving bodies move along the first and second slope sections.

With regard to the aforementioned configuration, the first and third hinged joints may be situated upstream or downstream with respect to an imaginary vertical plane orthogonal to the linear moving member at an intermediate position between the first and second moving bodies. The second hinged joint may be situated downstream or upstream with respect to the vertical plane.

According to the aforementioned configuration, the first and third hinged joints are situated upstream or downstream with respect to the imaginary vertical plane orthogonal to the linear moving member at the intermediate position between the first and second moving bodies whereas the second hinged joint is situated downstream or upstream with respect to the vertical plane. Therefore, the first and second arms are folded so that an intermediate portion of the first arm between the first and second hinged joints and an intermediate portion of the second arm between the second and third hinged joints overlap in a space formed between the base portion and the support body. Accordingly, the first and second arms do not largely project from the base portion and/or the support body in the conveying direction or in a direction opposite to the conveying direction.

With regard to the aforementioned configuration, the first or second moving body may be attached to the third hinged joint.

According to the aforementioned configuration, since the first or second moving body is attached to the third hinged joint, the support body may receive the driving force of the linear moving member via the third hinged joint. A change in height position of the first or second moving body is transmitted to the second arm to cause a change in angle defined by the first and second arms. Consequently, the transmission mechanism may vertically extend and contract.

With regard to the aforementioned configuration, the transmission mechanism may include: a slot member in which a slot is formed so as to determine a moving path of the second hinged joint while the first and second moving bodies move along the first and second slope sections respectively; and an inserting portion inserted in the slot at the second hinged joint.

According to the aforementioned configuration, since the inserting portion is inserted in the slot of the slot member at the second hinged joint, the second hinged joint may move along the moving path defined by the slot. Therefore, a position of the second hinged joint in the conveying direction and the height direction is determined by the slot and the height position of the third hinged joint to which the first or second moving body is attached.

With regard to the aforementioned configuration, the first and second guide rails may be unified over a predetermined extension to form a rail unit.

According to the aforementioned configuration, since the first and second guide rails are unified over a predetermined extension section to form a rail unit, an operator may remove the rail unit to form a space in the extension section in which the rail unit has been formed when a design change about a support position of the support body happens to the extension section in which the first rail unit has been formed. The operator may then place another rail unit appropriate for the changed design in the formed space. Accordingly, since a large space for forming a new conveyance path is obtained merely by removing the rail unit, it becomes efficient to change a conveyance path of the support body.

With regard to the aforementioned configuration, the first moving body may roll along the first guide rail.

According to the aforementioned configuration, since the first moving body rolls along the first guide rail, the first moving body and the first guide rail may be slowly worn.

With regard to the aforementioned configuration, the linear moving member may be extended above the first guide rail.

According to the aforementioned configuration, since the linear moving member is extended above the first guide rail, a large space is formed below the linear moving member. A large space is formed below the first guide rail in a section in which the first guide rail extends near the linear moving member. The large space below the first guide rail is effectively used for an operation other than an operation for the conveyed object supported by the support body.

INDUSTRIAL APPLICABILITY

The principles of the aforementioned embodiment are appropriately applicable to various manufacturing sites.

This application is based on Japanese Patent application No. 2017-238701 filed in Japan Patent Office on Dec. 13, 2017, the contents of which are hereby incorporated by reference.

Although the present invention has been fully described by way of example with reference to the accompanying drawings, it is to be understood that various changes and modifications will be apparent to those skilled in the art. Therefore, unless such changes and modifications depart from the scope of the present invention hereinafter defined, they should be construed as being included therein.

The invention claimed is:
1. A conveying apparatus comprising:
a support body configured to support a conveyed object;
a linear moving member extended at a predetermined height position and configured to move in a predetermined conveying direction;
a first guide rail including a first slope section inclined in the conveying direction from a predetermined first height position to a second height position different from the first height position, and configured to support the support body which moves in the first slope section;
a second guide rail configured to form a second slope section at a position away from the first slope section by a predetermined horizontal distance which is set in the conveying direction, the second slope section being inclined in the conveying direction by a difference in height between the first and second height positions, and
a transmission mechanism configured to transmit a driving force of the linear moving member to the support body when the linear moving member moves in the conveying direction,
wherein the support body includes: a first moving body configured to move along the first guide rail; a second moving body situated at a position away from the first moving body by the predetermined horizontal distance, and configured to move along the second guide rail; and a placement portion connected to the first and second moving bodies, the conveyed object being placed on the placement portion, wherein an inclination angle of the second slope section is set so that a posture of the placement portion remains unchanged while the first moving body moves in the first slope section, wherein the transmission mechanism includes: a base portion configured to receive the driving force of the linear moving member; a first arm configured to form a first hinged joint in cooperation with the base portion, and extend obliquely downward from the first hinged joint; and a second arm configured to form a second hinged joint as a connection point with the first arm and extend obliquely downward from the second hinged joint in a direction, in which the second arm is bent from the first arm, the second arm forming a third hinged joint in cooperation with the support body, a slot member in which a slot is formed so as to determine a moving path of the second hinged joint while the first and second moving bodies move along the first and second slope sections respectively, and an inserting portion inserted in the slot at the second hinged joint, the transmission mechanism being configured to vertically extend and contract with changing an angle defined by the first and second arms at the second hinged joint in response to a change in vertical distance between the first guide rail and the linear moving member extended at the predetermined height position while the support body moves on the first slope section in the conveying direction with being supported by the first guide rail, wherein each of the first and second arms is longer than the predetermined horizontal distance, and wherein the first moving body or the second moving body is attached to the third hinged joint.

2. The conveying apparatus according to claim 1, wherein the first and third hinged joints are situated upstream or downstream with respect to an imaginary vertical plane orthogonal to the linear moving member at an intermediate position between the first moving body and the second moving body, and wherein the second hinged joint is situated downstream or upstream with respect to the imaginary vertical plane.

3. The conveying apparatus according to claim 1, wherein the first guide rail and the second guide rail are unified over a predetermined extension section to form a rail unit.

4. The conveying apparatus according to claim 1, wherein the first moving body rolls along the first guide rail.

5. The conveying apparatus according to claim 1, wherein the linear moving member is extended above the first guide rail.

6. A conveying apparatus comprising:

a support body configured to support a conveyed object, the support body including a first roller;

a linear moving member extended at a predetermined height position and configured to move in a predetermined conveying direction;

a first guide rail including a first slope section inclined in the conveying direction from a predetermined first height position to a second height position different from the first height position, and configured to support the support body which moves in the first slope section, the first roller being configured to move along the first guide rail; and a transmission mechanism configured to transmit a driving force of the linear moving member to the support body when the linear moving member moves in the conveying direction, wherein the transmission mechanism vertically extends and contracts in response to a change in vertical distance between the first guide rail and the linear moving member extended at the predetermined height position while the support body moves on the first slope section in the conveying direction with being supported by the first guide rail, the transmission mechanism including a base portion configured to receive the driving force of the linear moving member; a first arm configured to form a first hinged joint in cooperation with the base portion, and extend obliquely downward from the first hinged joint; and a second arm configured to form a second hinged joint as a connection point with the first arm and extend obliquely downward from the second hinged joint in a direction, in which the second arm is bent from the first arm, the second arm forming a third hinged joint in cooperation with the support body, wherein the first roller is attached to the third hinged joint.

7. The conveying apparatus according to claim 6, further comprising:

a second guide rail configured to form a second slope section at a position away from the first slope section by a predetermined horizontal distance which is set in the conveying direction, the second slope section being inclined in the conveying direction by a difference in height between the first and second height positions, wherein the support body includes a second roller situated at a position away from the first roller by the predetermined horizontal distance, the second roller being configured to move along the second guide rail; and a placement portion connected to the first and second moving bodies, the conveyed object being placed on the placement portion, and wherein an inclination angle of the second slope section is set so that a posture of the placement portion remains unchanged while the first roller moves in the first slope section.

8. The conveying apparatus according to claim 7, wherein the transmission mechanism is configured to vertically extend and contract with changing an angle defined by the first and second arms at the second hinged joint, and wherein each of the first and second arms is longer than the predetermined horizontal distance.

9. The conveying apparatus according to claim 8, wherein the first and third hinged joints are situated upstream or downstream with respect to an imaginary vertical plane orthogonal to the linear moving member at an intermediate position between the first and second rollers, and wherein the second hinged joint is situated downstream or upstream with respect to the imaginary vertical plane.

10. The conveying apparatus according to claim 7, wherein the first and second guide rails are unified over a predetermined extension section to form a rail unit.

11. The conveying apparatus according to claim 6, wherein the linear moving member is extended above the first guide rail.

12. The conveying apparatus according to claim 6, wherein the first roller rolls along the first guide rail.

* * * * *